E. C. GORDON.
Improvement in Whiffletrees.
No. 128,723.  Patented July 9, 1872.
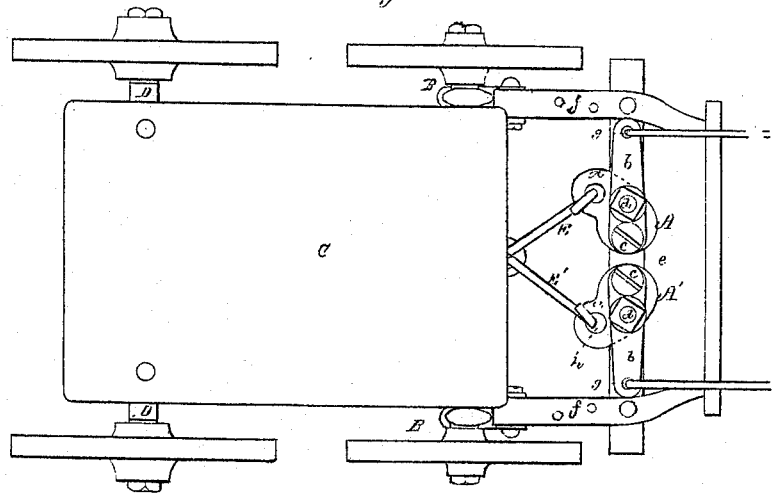
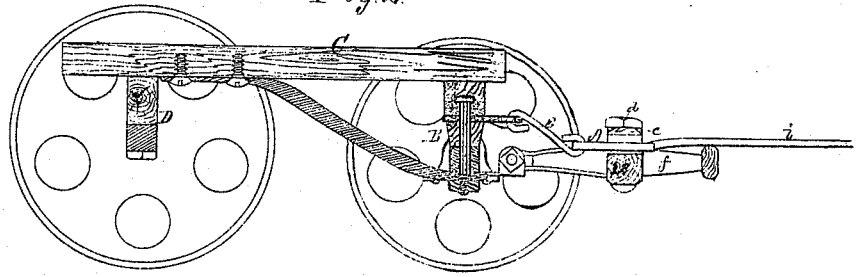
Witnesses.
Earl C. Gordon
by his attorney

UNITED STATES PATENT OFFICE.

EARL C. GORDON, OF SALEM, NEW HAMPSHIRE.

IMPROVEMENT IN WHIFFLETREES.

Specification forming part of Letters Patent No. 128,723, dated July 9, 1872.

*To all persons to whom these presents may come:*

Be it known that I, EARL C. GORDON, of Salem, of the county of Rockingham and State of New Hampshire, have invented a new and useful Improvement in Wheel Carriages; and do hereby declare the same to be fully described in the following specification and represented in the accompanying drawing, of which—

Figure 1 is a top view, and Fig. 2 a longitudinal section, of a wheel carriage provided with my invention, it being what may be termed a "duplex whiffletree."

In lieu of the common single whiffletree I employ two levers, separate and having separate fulcrums, they being applied to the back bar or connection-bar of the shafts, and connected to the forward axle by links or brace-rods, or their equivalents. In the drawing, these levers are shown at A A', and each as composed of two plates, $a\ b$, fastened together by a screw, $c$, the longer plate being arranged on the shorter, in manner as shown, and each being applied to and so as to turn on a common fulcrum, $d$, projecting up from the cross-bar $e$ of the shafts $f\ f$. Their shafts are pivoted to the front axle B of the carriage-body C, the rear axle being represented at D.

Generally I prefer to have the shafts provided with short slots instead of round holes to receive the pivot-pins for connecting them to the axle, the same being to admit of a slight play of the shafts back and forth on the pins, in order that the links and levers may not be cramped in their operations.

Each of the levers is furnished with two holes, $g\ h$, one being to receive the trace $i$ and the other one of two links, E E', extended from the lever to and hooked or jointed to an eye or projection, $h$, from the front axle, all being as shown.

When a common whiffletree breaks under the strain of the traces the horse is liable to rush forward out of the shafts, which, in consequence of the driver having hold of the reins and pulling them so as to restrain the animal, are liable to be jerked against his legs so as to cause him to kick up and do injury to the carriage. With my invention, however, should one of the levers or its links become broken, the others, remaining intact, will serve to keep the horse in place in the shafts, thus preventing him from escaping from the carriage, or the shafts from falling out of the tugs and down about the legs of the horse.

Each lever may be in one single piece of metal; but I prefer to make it in two pieces, as shown, with a pivot hole-in the upper somewhat larger in diameter than that of the pivot or fulcrum, such allowing the brace-links to work freely during the movements of the shafts up and down.

I claim—

1. The two levers A A' and the braces or connection-links E E', as described, combined and arranged with the shafts or their connection-bar and the front axle B of a carriage, all being substantially as specified.

EARL C. GORDON.

Witnesses:
R. H. EDDY,
S. N. PIPER.